Patented Dec. 19, 1939

2,183,830

UNITED STATES PATENT OFFICE 2,183,830

DECOLORIZATION OF STILL RESIDUE

Samuel G. Burroughs, Pittsburgh, Pa., assignor to Pennsylvania Industrial Chemical Corporation, a corporation of Pennsylvania No Drawing. Application August 20, 1938, Serial No. 225,986

3 Claims. (Cl. 260—81)

This invention relates to decolorizing the resin-bearing coal-derived material known as "still residue".

Resin derived from such still residue is fundamentally coumarone-indene resin, and if the still residue be purified by removal of sulphonates prior to the recovery of the resin from the solvent content of the still residue, as by distillation, it corresponds very closely to the coumarone-indene resin derived by intentionally effecting polymerization in crude solvent naphtha, drip oil, or other liquids containing coumarone and indene. An undesirable peculiarity of this still residue derived coumarone-indene resin is, however, a dark coloration, which corresponds usually to a 13 to 15 color intensity on the coal tar resin color scale. This deep coloration is not to be confused with the color caused by the yellowing tendency of coumarone-indene resins derived by a polymerization conducted in crude solvent naphtha, or the like, but is different from, and additional to, that coloration typical of the coumarone-indene resins. In seeking to modify this coloration, I have discovered that it is caused by an inclusion of oxidized phenolic substances and mercaptans in the still residue, and have discovered how they may be removed and the color intensity of the resin correspondingly reduced. First I shall describe the starting material from which the resin under discussion is recovered.

The "still residue" with which I work has its proximate derivation in light oil derived in the by-product distillation of coal. This light oil comes over in by-product coking, and is recovered from the gases with which it comes over by absorbing it in a scrubbing oil, which scrubbing oil is usually a heavy cut of petroleum. The still residue itself results from fractionating and purifying treatment of this light oil, following its separation from the scrubbing oil. This still residue contains polymers of resin-forming bodies in various stages of polymerization, some heavy monomers, traces of naphthalene, and various percentages of sulphates and sulphonates. It is a dark, viscous, oily substance deficient in drying qualities, and as it occurs possesses but little utility in the arts. As it is commercially available, the still residue may be obtained from any one or more of the following operations conducted upon the light oil.

One such source of still residue is the stills in which the light oil is purified and fractionated to give crude benzol, crude toluol, No. 1 crude solvent naphtha (crude xylol), and No. 2 crude solvent naphtha. The residuum from this fractionation consists largely of heat polymers, and is known in the trade as "crude still" residue. Either the entire body of light oil, or fractions from the crude still, after washing with sulphuric acid and neutralizing, are distilled in what are known in the trade as "pure stills". The residues from the distillation of these fractions comprise primarily acid polymers and heat polymers, and comprise also sulphates and sulphonates from acid purification and neutralization. This "pure still" residue normally is mixed in a tank with the "crude still" residue, so that, as it is commercially available, still residue contains at least the residual products from these two types of still dealing with coke-oven light oil and its fractions.

Usually there is also mixed in with these two still residues in the residue tank a third residue, which comprises bottoms from the distillation of the heavier cuts of No. 1 and No. 2 crude solvent naphtha. Usually the still residue is subjected to a distillation for the removal of solvents and naphthalene. There is a variation in the above-noted practice in different coking plants.

A light oil is in some plants additionally recovered by distillation of the tar in which it is entrapped, not all of the light oil coming over during the initial distillation. This fraction of light oil as initially recovered from the tar is contaminated with phenols, pyridine bases and compounds, and other typical tar ingredients, which, however, can be removed by a preliminary purification prior to the several typical fractionating and purifying treatments given above to which the light oil is subjected. Light oil thus obtained may be considered substantially as free from tar ingredients as is the light oil recovered from direct distillation of the coal.

Due to the presence of sulphur-containing compounds of coumarone and indene, which comprise sulphonates, sulphate additives, and sulphones, all of which I herein group under the single term "sulphonates", a very dark resin would be recovered by a simple distillation of the still residue. It is possible, however, to remove these sulphonates either by solvent separation in the manner disclosed in the Patent No. 2,135,427, issued to Frank W. Corkery, November 1, 1938, and the application of Frank W. Corkery Serial No. 205,302, filed April 30, 1938, or by decomposition of the sulphonates as disclosed in the application of Frank W. Corkery, Serial No. 182,804, filed December 31, 1937, and the joint application of Frank W. Corkery and myself, Serial No. 217,580, filed July 5, 1938. Following such removal of sulphonates the color of a solid resin, as recovered from a still residue by distilling off the solvent content thereof, would be expected to correspond quite closely to that of a coumarone-indene resin produced by a catalyzed polymerization. Such, however, is not the case, but on the contrary, resin recovered by distillation from the purified still residue usually has, as noted above, a color intensity of from 13 to 15 on the coal tar resin color scale, being a dark red.

An exemplary operation for removing sulphonates may be given as follows: 900 gallons of still residue were diluted with 700 gallons of solvent for the still residue. This solvent may be either an aromatic solvent, such as solvent naphtha, or may be a low-boiling aliphatic solvent, such as petroleum naphtha. The still residue solution was agitated with 200 gallons of water, and steam was turned into the still residue solution to raise its temperature. When the temperature of the solution reached 50° C., 60 gallons of 66° Bé. sulphuric acid was added and agitation of the reaction mixture was continued. The exothermic nature of the reaction which followed raised the temperature of the reaction mixture to about 65° C., at which temperature the mixture remained, while being agitated for about twenty minutes. The mixture became noticeably thinner as a result of the reaction, and a dense white precipitate of calcium sulphate was formed throughout the mixture.

The reacted mixture was allowed to settle to the bottom of the vessel, and above this precipitate a water layer separated. This water layer contained about 400 gallons of water consisting of the 200 gallons initially added, and approximately 200 gallons of water condensed from the steam. The still residue solution was floated upon the water layer. In recovery, the calcium sulphate and water are run off, leaving a still residue solution. This still residue solution is desirably given two water washings, followed by a very dilute alkaline wash.

To reduce the color intensity of the resin to that of a relatively dark colored coumarone-indene resin, I may take as my starting material a purified and dilute still residue, such as that resulting from the above-described purification, or may dissolve a resin recovered by distillation from a still residue which has been purified by removal of sulphonates. In the latter case the solution may conveniently be made by dissolving the resin in an equal weight of either aromatic hydrocarbon solvent, or relatively low-boiling aliphatic hydrocarbon solvent.

Fundamentally considered, my method consists in heating such resin solution with a finely divided metal and a weak acid in the presence of water; thereby to eliminate the colorizing substances from the resin by decomposition of such substances, accompanied by their removal either by evolution or by solution in the water. Any finely divided metal may be used, which tends sufficiently to remain in metallic state as to be readily available in that state as a comminute, but which is reasonably reactive with weak acids. Such metals are those including and embraced between aluminum and tin in the electro-motive series. By the term "weak acid" I mean to include both mono-basic and poly-basic acids of the carboxyl type and of the hydroxy type, and their substitution products, excluding in each series those higher members which are insoluble in water and which will not return a pH value within the range of 1 to 6. For reasons of convenience, I prefer to use as the metal, iron filings, or zinc dust; and prefer to use as the weak acid, oxalic acid, acetic acid, lactic acid, gallic acid, or tartaric acid. The following is exemplary of my method of decolorizing the still residue:

Taking 250 parts by weight of the still residue solution there was mixed with it 2 parts by weight of zinc dust, 2 parts by weight of oxalic acid, and 20 parts by weight of water. The mixture was then refluxed for a relatively long period of time at a temperature of about 135° C. As refluxing continues, and reaction proceeds in the batch, the still residue solution progressively lightens in color, and there is a continuous, slow, evolution of hydrogen sulphide. This latter indicates the decomposition of a mercaptan. If the mixture be allowed to settle, and a sample of the water layer be taken at the stage in the operation when evolution of hydrogen sulphide becomes observable, phenolic substances will be found in the layer. This indicates that reduction of oxidized phenolic bodies is accompanying the decomposition of the mercaptans.

When evolution of hydrogen sulphide is no longer observable, and a check of the water layer fails to indicate the presence of additional phenolics, it may be taken for granted that maximum decolorizing obtainable by practicing this method, has been effected. This maximum decolorization under simple reflux conditions requires from 12 to 16 hours of treatment. When the reaction has proceeded to a maximum, the spent acid and metal, and the water layer, are drawn off. The solution is then washed with water, and desirably with a dilute alkaline solution, such as a dilute solution of sodium hydroxide. It is then in condition for distillation, in any of the well known ways, for the recovery of solvent and coumarone-indene resin.

Resort to mechanical agitation, to accelerate circulation or otherwise to improve contact in the reaction mixture, so speeds the reaction as to shorten the treating time to about eight hours, but for reasons of convenience and economy in plant operation, I usually prefer to operate my method under simple reflux conditions. The reaction is inherently slow, and I have found that it cannot be accelerated to any substantial extent by increasing the proportional quantity of the metal, or of acid, or of both the metal and the acid. The use of a strong acid, such as sulphuric acid, hydrochloric acid, or nitric acid, defeats the purpose of the process. Temperature accelerates the reaction, and it is, therefore, desirable (although not necessary) to dissolve the resin in a solvent, such as solvent naphtha or mineral spirits, which has a relatively high boiling point. If a solvent of lower boiling point be used, difficulty is experienced in accelerating the reaction to the same extent by equally elevating the temperature of the solution.

While this treating method does not wholly remove from the still residue the oxidized phenolics and mercaptans initially contained in it, it does reduce the color depth of the resin from a dark red coloration corresponding to from 12 to 15 on the coal tar resin color scale to a much lighter reddish yellow coloration corresponding to a color depth of 7 to 9, inclusive, on the coal tar resin color scale. This color reduction is of greater actual bleaching value than would appear from the figures given, and is of substantial practical value. For instance it may be noted that on the coal tar resin color scale, color 15 is ten times as deep as color 5 while color 7 is only twice the depth of color 5. Thus a reduction from color 15 to color 7 means that the objectionable color depth (depth above a 5 color) has been reduced to the extent of about 80%. It greatly facilitates pigmentation of both mastic tile and coating compositions in which the resin is included.

It should be emphasized that the color-imparting bodies which are to a great extent removed by my method, are bodies which are not usually found in coumarone-indene resins produced by a polymerization conducted in crude solvent naphtha or an equivalent coumarone and indene containing liquid. My method, therefore, is to be considered peculiar to the treatment of the still residue which has been above fully defined, and resin-bearing liquids equivalent to such still residue, and is not to be considered as a method of reducing the color intensity of coumarone-indene resin, as such resin is commonly produced by polymerization processes in commercial practice.

I claim as my invention:

1. The method herein described of reducing the color intensity of coumarone-indene resin recovered from still residue resultant from fractionation and purification of light oil derived in the by-product coking of coal, which comprises treating the resin in solution and in the presence of water simultaneously with a weak acid and a finely divided metal of the class including and between aluminum and tin in the electromotive series while heating the resin solution.

2. The method herein described of reducing the color intensity of coumarone-indene resin recovered from still residue resultant from fractionation and purification of light oil derived in the by-product coking of coal, which comprises treating the resin in solution and in the presence of water simultaneously with a weak acid and a finely divided metal of the class including and between aluminum and tin in the electromotive series while heating and agitating the resin solution.

3. The method herein described of reducing the color intensity of coumarone-indene resin recovered from still residue resultant from fractionation and purification of light oil derived in the by-product coking of coal, which comprises refluxing the resin in solution in a solvent having a boiling point approximately as high as the boiling points of solvent naphtha and mineral spirits and in the presence of water with a weak acid and a finely divided metal of the class including and between aluminum and tin in the electromotive series.

SAMUEL G. BURROUGHS.